(12) United States Patent
Herrström

(10) Patent No.: US 10,960,556 B2
(45) Date of Patent: Mar. 30, 2021

(54) VACUUM POWERED TOOL

(71) Applicant: Piab Aktiebolag, Täby (SE)

(72) Inventor: Jonas Herrström, Täby (SE)

(73) Assignee: Piab Aktiebolag, Taby (SE)

( * ) Notice: Subject to any disclaimer, the term of this patent is extended or adjusted under 35 U.S.C. 154(b) by 111 days.

(21) Appl. No.: 16/282,394

(22) Filed: Feb. 22, 2019

(65) Prior Publication Data

US 2019/0263002 A1 Aug. 29, 2019

(30) Foreign Application Priority Data

Feb. 27, 2018 (EP) ..................................... 18158788

(51) Int. Cl.
*B25J 15/00* (2006.01)
*B25J 15/08* (2006.01)
*B25J 15/12* (2006.01)
*B25J 9/14* (2006.01)

(52) U.S. Cl.
CPC ............. *B25J 15/0023* (2013.01); *B25J 9/14* (2013.01); *B25J 9/142* (2013.01); *B25J 9/144* (2013.01); *B25J 15/08* (2013.01); *B25J 15/12* (2013.01)

(58) Field of Classification Search
CPC . B25J 15/0023; B25J 15/12; B25J 9/14; B25J 9/142; B25J 9/144
USPC ......................................................... 294/196
See application file for complete search history.

(56) References Cited

U.S. PATENT DOCUMENTS

| | | | | |
|---|---|---|---|---|
| 4,592,581 A | * | 6/1986 | Howard ..................... | B66C 1/46 294/111 |
| 5,263,753 A | | 11/1993 | Breu et al. | |
| 5,458,388 A | * | 10/1995 | Danek ..................... | B65G 47/90 294/100 |
| 2004/0212206 A1 | * | 10/2004 | Chang .................. | B81C 99/002 294/99.1 |
| 2009/0108605 A1 | | 4/2009 | Becker et al. | |

(Continued)

FOREIGN PATENT DOCUMENTS

| | | | |
|---|---|---|---|
| CN | 103889876 A | 6/2014 | |
| DE | 4432253 A1 * | 3/1996 | ............. B25J 9/142 |

(Continued)

OTHER PUBLICATIONS

European Search Report for corresponding European Patent Application No. 18158788.2 dated Oct. 30, 2018.

(Continued)

*Primary Examiner* — Dean J Kramer
(74) *Attorney, Agent, or Firm* — Renner, Otto, Boisseile & Sklar, LLP

(57) ABSTRACT

Vacuum powered tool that is connectable to a vacuum source and arranged in an object engagement position to engage and hold an object as a result of a negative pressure in the tool as well as to resiliently return to an initial position when the negative pressure ceases. The tool comprises an object handling engagement part, wherein the tool, in a first end, has a fitting to be fixedly received in a vacuum connection implement for fixation of the tool, and in a second end of the tool, wherein the second end is formed for air-proof contact and provided with an at least partly flexible and collapsible spherical hollow inner geometry onto which at least partly spherical and collapsible hollow inner geometry having a collapsible part.

11 Claims, 2 Drawing Sheets

A-A

(56) References Cited

U.S. PATENT DOCUMENTS

2012/0025553 A1* 2/2012 Fischer ................ B25J 15/103
　　　　　　　　　　　　　　　　　　　　　294/198
2014/0360358 A1* 12/2014 Tell ........................ B25J 15/12
　　　　　　　　　　　　　　　　　　　　　92/174
2016/0096278 A1　　4/2016 Cho
2017/0203443 A1　　7/2017 Lessing et al.

FOREIGN PATENT DOCUMENTS

DE　　10 2005 046160 B3　　3/2007
WO　　　2015/123128 A1　　8/2015

OTHER PUBLICATIONS

Chinese Office Action and translation for corresponding Chinese Patent Application No. 201910145258.3 dated Jul. 14, 2020.

* cited by examiner

VACUUM POWERED TOOL

This application claims priority to European Patent Application No. 18158788.2 filed on Feb. 27, 2018, which is hereby incorporated herein by reference.

TECHNICAL FIELD

The invention relates generally to vacuum powered tools. More precisely, the invention relates to a vacuum powered gripper tool having that is connectable to a vacuum source and arranged to in a gripping position hold an object as a result of a negative pressure in the tool as well as to resiliently return to the original position when the negative pressure ceases. In an additional aspect, the invention relates to a vacuum powered object holding and engagement tool having a further vertical lifting appliance.

BACKGROUND AND PRIOR ART

Vacuum powered tools are supplied with negative pressure from a vacuum source, which may be an ejector arranged adjacent to the gripper tool or a centrally arranged ejector or pump that serves several vacuum powered tools often employed for the sorting or picking of articles and packages. A vacuum powered tool such as a vacuum powered gripper is connected to the vacuum source in order to by suction effect via an object handling and engagement appliance generate an engagement with objects that are to be handled by the vacuum powered tool.

SUMMARY OF THE INVENTION

According to a first aspect of the present invention, there is provided a vacuum powered tool that is connectable to a vacuum source and arranged to in an object engagement position engage and hold an object as a result of a negative pressure in the tool as well as to resiliently return to an initial position when the negative pressure ceases. The vacuum powered tool comprises an object handling engagement appliance, wherein the tool, in a first end, has a fitting to be fixedly received in a vacuum connection implement for fixation of the tool. In a second end of the tool, the second end is formed for air-proof contact with and provided with an at least partly flexible and collapsible essentially spherical hollow inner geometry onto which essentially spherical and at least partly collapsible hollow inner geometry having at least one collapsible part, object handling and engagement means are provided and arranged such as to by means of gripping means driven in mutually opposite directions, in the object engagement position engage and hold the object as a result of the negative pressure in the flexible and collapsible essentially spherical hollow inner geometry has collapsed at least partly, as well as to resiliently return to the initial position when the negative pressure in the flexible and collapsible spherical hollow inner geometry ceases.

The flexible and collapsible spherical hollow inner geometry is typically provided to collapse partly by means of a stopper element provided inside the flexible and collapsible essentially spherical hollow inner geometry, but may in certain embodiments, typically without any stopper element collapse entirely.

Typically, on an outside of the essentially spherical hollow inner geometry, there are provided fixed gripper means in one end pivotable inwards/outwards from a longitudinal line and arranged to engage and hold the object as a result of the negative pressure collapsing the collapsible part and as a result of no negative pressure applied, respectively release the object.

Vacuum powered gripper tools that are arranged with an object handling and engagement appliance by means of gripping means driven in mutually opposite directions, are often employed for the sorting or picking of articles and packages.

According to a second aspect of the present invention, including the features of the first aspect, there is further provided a vertical lifting appliance.

In vacuum powered gripper tools that are employed for the handling of objects having uneven or leaning surfaces, the vertical lifting appliance can be embodied as a flexible bellows. The flexibility and compression capacity of the flexible bellows allow an adaptation to the shape or position of the object so that the requisite inclination can be obtained between the object and a gripper means coupled to the bellows. The flexibility of the bellows is also advantageous in the handling of sensitive or deformable surfaces and materials.

In a preferred embodiment, the bellows is arranged with an attachment for an object handling and engagement appliance having gripper arms protruding from the free end of the bellows, with a gripping or clamping implement arranged in a free end of the arm. Said implement may be given varying design for different types of action on the handled object.

As an example, an embodiment may be mentioned wherein each gripper arm, in its free end, supports a friction element in applications that include clamping against the outside or against the inside of an object. In another embodiment, the arm may, in its free end, support a claw in applications that include catching or holding of an object.

The bellows insert is preferably made of a castable material, such as a thermoplastic synthetic material, and moulded integrally.

Embodiments accounted for above of details in the solution can be utilized in different mutual combinations for the adaptation of an existing tool to varying needs and for different types of actions on objects to be handled.

BRIEF DESCRIPTION OF THE DRAWINGS

Embodiment examples of the invention are explained in more detail below, reference being made to accompanying schematic drawings. In the drawings

DETAILED DESCRIPTION OF PREFERRED EMBODIMENT EXAMPLES

Figure 1:
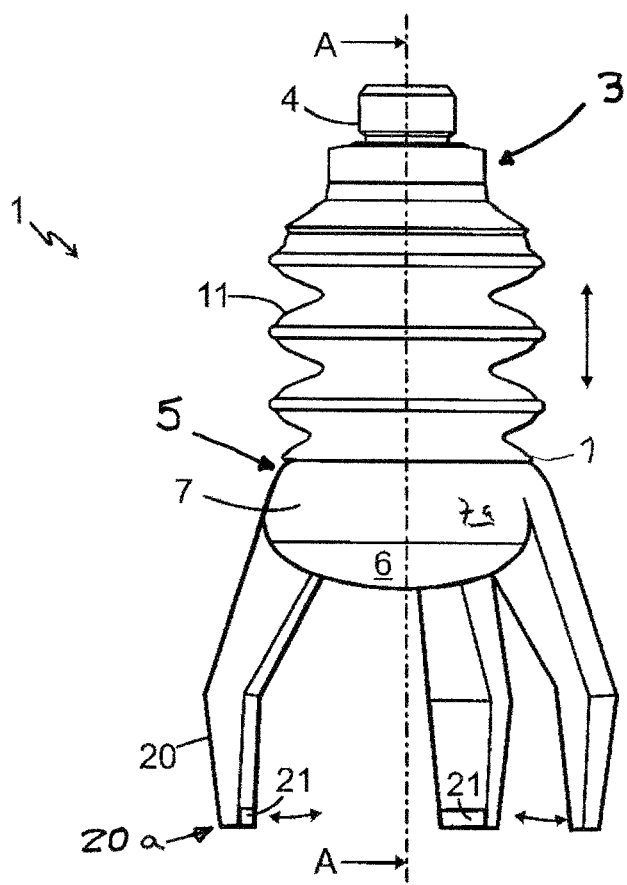
FIG. 1 shows a vacuum powered tool according to the embodiment shown in FIG. 1 including a object handling and engagement appliance and a bellow, wherein the fitting and support are shown in view from an outside.
Figure 2:
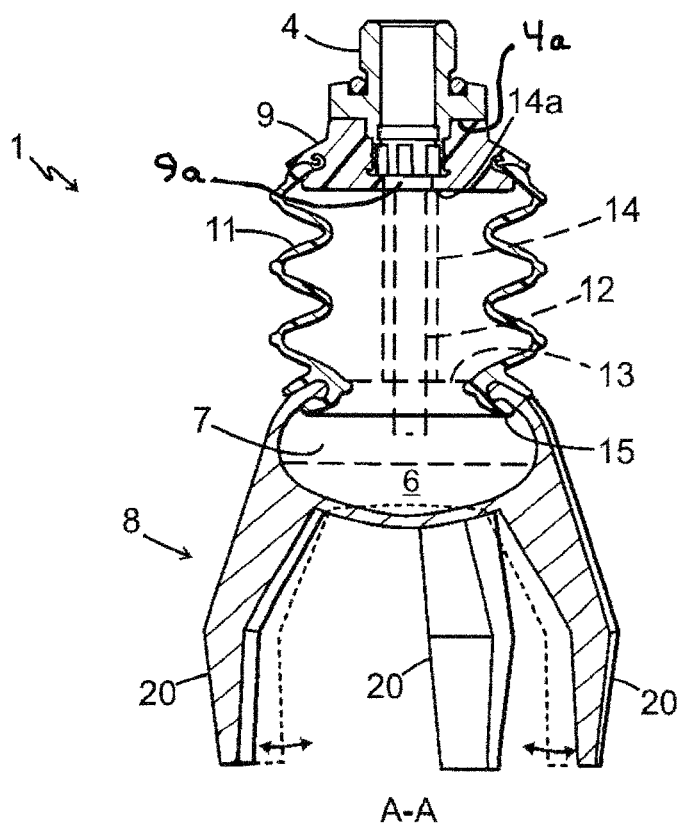
FIG. 2 shows a vacuum powered tool according to an embodiment including a object handling and engagement appliance and a bellow, wherein the fitting and support is shown in cross-section along a vertical line shows a cross-section through a bellows having a mounted bellows insert along line A-A.

In FIGS. 1, and 2 there is illustrated in a vacuum powered tool generally designated by the reference numeral 1.

The vacuum powered tool 1 is supplied with negative pressure from a vacuum source, which may be an ejector arranged adjacent to the vacuum powered tool 1 or a centrally arranged ejector or pump that serves several vacuum powered tools. The vacuum powered tools are often employed for the sorting or picking of objects such as articles and packages.

Herein, a vacuum powered tool such as a vacuum powered gripper is connected to the vacuum source in order to, by suction effect, via an object handling and engagement appliance generate an engagement with the objects that are to be handled and engaged by the vacuum powered tool.

The tool 1 in FIGS. 1 and 2, respectively, in a first end 3, has a fitting 4 to be fixedly received in a vacuum connection implement for fixation of the tool 1.

The tool 1 in FIGS. 1 and 2 is typically carried by the fitting 4 for the fixation of the tool 1. To the fitting 4, a negative pressure such as a vacuum source (not shown) can be connected, from where negative pressure can be introduced into the tool 1 via the fitting 4, through a, typically essentially disc shaped, first support 9 having a through-going hole 9a in a central part thereof and a first conduit 12 arranged to go through the through-going hole 9a, having an opening in a second end 5 (herein via an intermediate bellows 11). The vacuum source may be a pump or ejector that is placed outside the tool 1 and from which negative pressure is led to the tool 1 via a pipe (not shown).

The second end 5 is formed for air-proof contact with and provided with an essentially spherical and at least partly collapsible hollow inner geometry 7 having at least a collapsible part 6 onto which at least a partly spherical collapsible hollow inner geometry 7, an object handling and engagement appliance 8 are provided and arranged such as to in the object engagement position engage and hold the object as a result of the negative pressure in the at least partly spherical and collapsible hollow inner geometry 7 having a collapsible part 6 that has collapsed, as well as to resiliently return to the initial position (bold lines) when the negative pressure in the at least partly spherical and collapsible hollow inner geometry 7 having a at least partly collapsible spherical part 6 ceases and the collapsible spherical part 6 has returned its initial shape such that the hollow inner geometry 7 is essentially spherical.

The object handling and engagement appliance 8 is in one end arrangedand fixed on the collapsible spherical part 6 and arranged such that in the object engagement position in an opposite end engage and hold the object as a result of the negative pressure in the at least partly spherical and collapsible hollow inner geometry 7 having a collapsible part 6 as well as to resiliently return to the initial position when the negative pressure ceases and the collapsible part 6 returns to its initial position.

Typically, in addition or as an alternative, to the embodiment described, the object handling and engagement means 8 are provided and arranged to resiliently return to the initial position when the negative pressure in the hollow inner geometry 7 ceases and instead a positive pressure is provided such that the collapsible part 6 return to its original shape such that the inner geometry 7 is essentially spherical one again.

A free end 4a of the fitting 4 may be formed with a first support 9, for air-proof contact (via intermediate bellows 11 as shown in FIGS. 1 and 2) with the hollow inner geometry 7 having the collapsible part 6 collapsible part 6. Onto the at least partly collapsible spherical hollow inner geometry 7 having the part 6 an object handling and engagement appliance 8 is provided such as to in the object engagement position (dashed line) engage and hold the object as a result of the negative pressure in the hollow inner geometry 7 and the as well as to resiliently return to the initial position when the negative pressure in the hollow inner geometry 7 ceases.

By a solid line, an initial state is shown in FIG. 2, before a negative pressure introduced into the hollow inner geometry 7 has caused a collapse of the, typically essentially, spherical collapsible part 6 such that the hollow inner geometry 7 is no longer essentially spherical (a gripped object has been excluded for reasons of clarity).

The hollow inner geometry 7 can be made of a rubber compound, which comprises magnetically detective and antimicrobial additives. This provides protection against both pieces and/or fragments coming loose and thereby contaminating the object coming loose, as well as bacteria.

Herein, the term "antimicrobial" includes the term "antibacterial".

Now is referred only to FIG. 2 which shows a vacuum powered tool 1 according to an embodiment including an object handling and engagement appliance 8 and a bellows 11, wherein the first fitting 4 the first support 9 for mounting a bellows 11 onto which bellows 11 the object handling and engagement appliance 8 can be mounted, the bellows 11 and partly the object handling and engagement appliance 8 are shown in cross-section along a vertical longitudinal line A-A.

Figure 3:
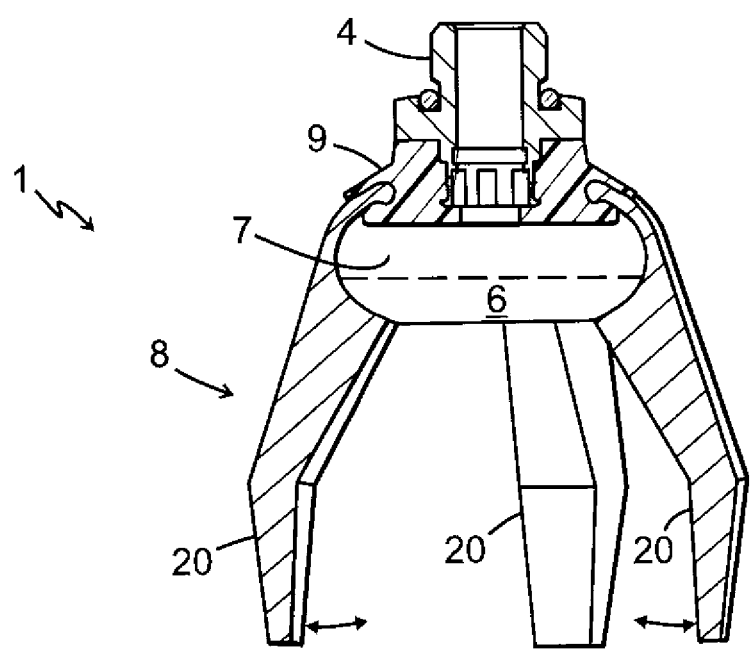
FIG. 3 shows a vacuum powered tool according to another embodiment without a bellows, wherein the object handling and engagement appliance is mounted directly on a support (referred to as 'first support') of the fitting.

Now is referred to FIG. 3, which shows a vacuum powered tool 1 according to another embodiment without a bellows, wherein the object handling and engagement appliance 8 is mounted directly on a support 9 (referred to as "first support") of the fitting 4.

Alternatively, the object handling and engagement appliance 8 can be mounted directly on the first support 9 (as shown in FIG. 3).

Now is referred back to FIGS. 1 and 2.

The initial state (no negative pressure) is shown wherein the collapsible spherical part 6 has expanded to its original shape such that the hollow inner geometry 7 is essentially spherical and normal pressure (or even positive pressure) prevails inside the hollow inner geometry 7, in the position of rest of the object handling and engagement appliance 8.

In a mounted position, the object handling and engagement appliance 8 for instance a gripper has elongate gripper means 20 fixed on an outside 7a (See FIG. 2) that extend in the longitudinal direction A-A and are driven, in mutually opposite directions, of the tool 1. Herein, the elongate gripper means 20 are in the form of a plurality (as an example three) of gripper arms 20. In a free end 20a of a respective arm 20, a gripper implement 21 is carried, the shape of which may vary in respect of which type of engagement with the handled object is suitable. In the embodiment example in FIGS. 1 and 2, the gripper implement 21 is realized in the form of a plate that is secured to the free end 20a of the gripper arm 20 and has knurls for increased friction and a better grip when the gripper arms 20 are driven, in mutually opposite directions, for the clamping of an object between the plates 21. The gripper implements may be formed as clamping or gripping implements and having lips, scoops or claws suitably shaped for the purpose.

When the at least partly spherical and collapsible hollow inner geometry 7 is subject to a negative pressure, typically vacuum, the at least partly spherical and collapsible hollow inner geometry 7 will be transferred from the initial position (bold lines) to a collapsed position (dashed lines). Since the gripper arms are fixed on the outside 7a of the essentially spherical and partly collapsible hollow inner geometry 7, the arms 20 will act to clamp the object in a clamping movement and move until the spherical and collapsible hollow inner geometry 7 will not collapse anymore vertically (See dashed lines). This movement can be limited by means of a stopper element 9, 15, for instance the support 9, in the embodiment without the bellows 11 or the support 15 in case of the embodiment with the bellows 11.

Alternatively, the flexible and collapsible essentially spherical hollow inner geometry 7 provided to collapse partly by means of the flexible and at least partly collapsible essentially spherical hollow inner geometry 7 is made of a material that is resistant enough so that a total collapse is not provided above a certain negative pressure. By means of adjusting the vacuum pressure, it is possible to adjust the clamping force of the gripper arms 20 gripping the object. This is not shown.

The essentially spherical hollow inner geometry 7 and the gripper arms 20 can be made of the same material such as rubber and may, or may not have the same material thickness.

Even if the gripper arms 20 are shown and described for engaging an outside of an object, it is appreciated that the gripper arms 20 alternatively can be arranged to drive the gripper arms 20 in movements directed from each other, for engaging the inside of a hollow object.

Among other feasible combinations of co-operating arms, one embodiment may be mentioned (as shown in the drawings) wherein three gripper arms 20 are arranged in a triangle having mutual angular distance of 120°. The three gripper arms 20 can be orientated to turn their attached gripper implements 21 outwards or inwards a centre A-A of the tool 1.

Various types of articles and packages are, however, not equally suitable to be gripped by means of an object handling appliance such as a gripper typically formed as 'gripper arms'. Accordingly, change from a hard package to a soft one may entail that the gripper arms and/or an gripper arm implement 21 provided to the gripper arm 20 has to be replaced by a gripper implement 21 that exercises another form of engagement than just gripping, such as pinching, clamping, locking, etc.

According to a second aspect and embodiment, including the features of the first aspect, there is provided a vertical lifting appliance.

This aspect is fulfilled in a vacuum powered tool 1, as shown and described in relation to FIGS. 1 and 2, comprising a bellows connectable to a vacuum source, which bellows is arranged to be compressed in its longitudinal direction as a result of a negative pressure in the bellows as well as to resiliently return to the original length when the negative pressure ceases, and having an attachment arranged in a free end of the bellows for an appliance, thereby providing vertically movement such as vertically lifting of the object. The compression capacity of the bellows is locally limited whereby the bellows at negative pressure is forced to undergo a controlled linear or non-linear compression by which the appliance attachment, as well as an object, if any, engaged in the object engagement appliance is driven in a vertically directed stroke movement as indicated by the double-headed arrow in FIG. 1.

By this solution, there is gained vacuum powered tool to handle also such objects or packages that are not suitable to be vertically lifted by means of the gripper appliance.

The vertical lifting appliance, herein embodied as a bellows 11 having its own vacuum source, is arranged such that in a first step, the tool is arranged to grip an object and in a second step the gripped object is lifted vertically. This is provided in that in the first step, the essentially spherical hollow inner geometry 7 is subject to vacuum pressure, but not the bellows 11 and in the second step also the bellows 11 is subject to vacuum pressure, whereby the bellows 11 is compressed and hence lifts the gripped object vertically along line A-A. The vacuum pressure in the second step is typically not provided by the same vacuum source in the first step providing vacuum to the spherical hollow inner geometry 7. The second step is not provided automatically and the vacuum pressure in the bellows 11 will not affect the vacuum pressure inside the essentially spherical hollow inner geometry 7.

This can be provided in that the bewllows 11 comprises an end plate 15, through which end plate vacuum channel 12 goes through.

In the vacuum powered gripper tool 1, as shown and described in relation to FIGS. 1 and 2, that are employed for the handling of objects having uneven or leaning surfaces, the vertical lifting appliance is embodied as the flexible bellows 11. The flexibility and compression capacity of the flexible bellows 11 also allow an adaptation to the shape or position of the object so that the requisite inclination (not shown) can be obtained between the tool 1 and an object coupled to the bellows 11. The flexibility of the bellows 11 is also advantageous in the handling of objects having sensitive or deformable surfaces and materials.

The bellows 11 is mounted air proof to the first support 9, for instance via a conventional snap-fitting (no reference numeral) or the like. The second end 5 is a free end of the bellows 11 the bellows 11 has a mounted bellows insert 14, herein a second conduit 14 for supply of negative pressure to the bellows 11. This second conduit 14 can be provided with a valve means 14a (schematically shown only) for turning negative pressure on or off to the bellows 11. This valve means 14a for turning negative pressure on or off to the bellows 11 is typically arranged to turn on negative pressure in the second conduit 14 in a second object lifting sequence following a first object gripping sequence wherein negative pressure is applied only to the hollow inner geometry 7.

The vacuum pressure in the second step is typically not provided by the same vacuum source in the first step providing vacuum to the spherical hollow inner geometry 7. The second step is not provided automatically and the vacuum pressure in the bellows 11 will not affect the vacuum pressure inside the essentially spherical hollow inner geometry 7. The vacuum provided to the essentially spherical hollow inner geometry 7 comes from the first conduit 12 arranged to go through the through-going hole 9a, through the bellows 11, but not penetrating the bellows 11 and ending up in the hollow inner geometry 7. The second conduit 14 goes through the first support 9 and ends up inside the bellows 11.

In a preferred embodiment, the bellows 11 is arranged with an attachment 15 for an object handling and engagement appliance 8 having gripper arms 20 protruding from the free end 5 of the bellows 11, with a gripping or clamping implement 21 arranged in a free end of the arm 20. Said implement may be given varying design for different types of action on the handled object.

Bellows for this purpose can be manufactured of rubber or of synthetic rubber mixings and have most often a circular cross-section, but could have a polygonal cross-section. Typically, the bellows have a uniform diameter size that is made up by the external periphery of a number of plate-shaped rings piled on each other, which form a tooth-shaped or sinusoidal profile in a longitudinal cross-section as shown in FIG. 2. The bellows 11 can be torsion resistant as a result of their structure, but are otherwise universally flexible. However, upon the introduction of negative pressure in the bellows 11, the bellows typically undergoes an essentially rectilinear axial compression, so as to provide a vertical lifting of the object, when the negative pressure ceases, return to its original shape by an inherent spring force that aims to bring back the bellows 11 to its original length.

The solution may be applied by utilizing a bellows that have a circular cross-section, wherein some or all of the pleats (not shown) of the bellows 11 are mutually fixed against compression within an angle interval of the cross-section.

The solution may just as well be applied by utilizing bellows that have a polygonal cross-section, wherein some or all of the pleats of the bellows are mutually fixed against compression in at least one side of the bellows.

In both cases, the pleats of the bellows may be mutually fixed against compression within a limited area of the circumference of the bellows by a filling (not shown) of the bellows pleats that is fixedly anchored or integrated formed in the bellows.

Said filling is preferably attached to the inside of the bellows, but may alternatively be attached to the outside of the bellows.

Alternatively, the pleats of the bellows may be mutually fixed against compression within a limited area of the circumference of the bellows by means of a separate insert (not shown) that is introducible into the bellows and formed to be mountable and dismountable without damage on the bellows. The insert can have a shape complementary to the inside of the bellows and fill up the pleats of the bellows in its mounted position inside the bellows. The insert is preferably rotationally fixedly mountable inside the bellows. According to this solution, the vacuum powered device can be readjusted for an alternative mode of operation without the bellows needing to be dismounted from the device.

The appliance attachment 15 in the free end 5 of the bellows is formed for a leakage-proof mounting of an appliance 8. The attachment of the appliance 8 in the bellows 11 may, for example, comprise a snap-in connection between the appliance 8 and an end wall tightly connecting to the bellows 11.

No further explanation of the structure of a bellows beyond what has been described initially is required for a person skilled in the art to understand the invention.

An advantageous embodiment of the filling includes a separate insert that is introducible into the bellows and can be mounted and dismounted without additional measures in the bellows.

A sealing ring (not shown in the drawing figures) may, where appropriate, be attached between the gripper appliance 8 and the gripper appliance attachment 15. Said ho, which has a circumferential groove in which a flange, formed on the inside of the free end of the bellows, is received in an air-proof way. A collar (not shown) fixedly anchored or formed on the gripper appliance may, where appropriate, be arranged to abut against the end of the bellows and provide increased stability of the joint between the appliance and bellows.

It will be appreciated that the invention provides flexibility by allowing simple adjustment of an existing installation to varying needs. It should also be appreciated that the invention may be modified in respect of detailed design of elements included in the embodiment examples accounted for without deviating from the fundamental solution and the general idea of the invention defined in the attached claims.

The invention claimed is:

1. A vacuum powered tool that is connectable to a vacuum source and configured to engage and hold an object as a result of a negative pressure in the tool as well as to resiliently return to an initial position when the negative pressure ceases, the vacuum powered tool comprising:
   an object handling engagement part,
   a fitting at a first end of the tool for connecting the tool to a vacuum connection implement, and
   an at least partly flexible and collapsible spherical hollow inner geometry at a second end of the tool, the at least partly flexible and collapsible spherical hollow inner geometry having at least one collapsible part,
   a first conduit for supplying negative pressure to the at least partly flexible and collapsible spherical hollow inner geometry,
   an object handling and engagement appliance including gripping means driven in mutually opposite directions for engaging and holding, the object as a result of the at least partly flexible and collapsible spherical hollow inner geometry collapsing at least partly as a result of negative pressure in the at least partly flexible and collapsible spherical hollow inner geometry, and wherein the gripping means resiliently returns to an initial position when the negative pressure in the at least partly flexible and collapsible spherical hollow inner geometry ceases,
   a first support attached to the fitting,
   a bellows mounted to the first support, the first support having a through channel for the supply of negative pressure to the bellows via a second conduit, wherein the bellows has an attachment part mounting the object handling and engagement appliance to the bellows, and wherein this second conduit has a valve for turning on and off the supply of negative pressure to the bellows.

2. The vacuum powered tool according to claim 1, wherein the object handling and engagement appliance comprises elongate grippers fixed to an outside of the at least partly flexible and collapsible spherical hollow inner geometry for pivotable movement inwards and outwards from a longitudinal line engaging the object as a result of negative pressure collapsing the collapsible part and for releasing the object as a result of no negative pressure being applied and uncollapsing of the collapsible part.

3. The vacuum powered tool according to claim 2, wherein the elongate grippers are formed by gripper arms that are provided with gripper implements.

4. The vacuum powered tool according to claim 1, wherein the at least partly flexible and collapsible spherical hollow inner geometry is collapsible partly by means of a stopper element provided inside the at least partly flexible and collapsible spherical hollow inner geometry.

5. The vacuum powered tool according to claim 1, wherein the at least partly flexible and collapsible spherical hollow inner geometry is made of a material that is resistant enough so that a total collapse is not provided above a certain negative pressure.

6. The vacuum powered tool according to claim 1, wherein the valve is arranged to turn on negative pressure in the second conduit in a second object lifting sequence following a first object gripping sequence wherein negative pressure is applied only to the hollow inner geometry.

7. The vacuum powered tool according to claim 6, wherein the attachment part has a through hole for the supply of negative pressure to the object handling and engagement appliance via the first conduit.

8. The vacuum powered tool according to claim 1, wherein the attachment part, in a longitudinal cross-section, has a continuous toothed or sinusoidal outside.

9. The vacuum powered tool according to claim 1, wherein the attachment part, in cross-section, has a partly circular outside adapted to the inside of the bellows that has a circular cross-section.

10. The vacuum powered tool according to claim 1, wherein the attachment part, in cross-section, has a straight outside adapted to the inside of the bellows having a polygonal cross-section.

11. The vacuum powered tool according to claim 1, wherein the bellows has a bellows insert formed integrally by casting.

* * * * *